Feb. 27, 1940.                J. B. VICTOR                2,191,873

OIL RETAINER WITH COMBINED DIAPHRAGM AND OUTER METAL SEAL

Filed Nov. 6, 1936

JOSEPH B. VICTOR
INVENTOR

PER *Albert J. Fihe*

ATTORNEY

Patented Feb. 27, 1940

2,191,873

UNITED STATES PATENT OFFICE 2,191,873

OIL RETAINER WITH COMBINED DIAPHRAGM AND OUTER METAL SEAL

Joseph B. Victor, Oak Park, Ill., assignor to Victor Manufacturing & Gasket Company, Chicago, Ill., a corporation of Illinois Application November 6, 1936, Serial No. 109,498

1 Claim. (Cl. 288—3)

This invention relates to an improved oil retainer with combined diaphragm and outer metal seal, and has, for one of its principal objects, the provision of an oil seal or grease retainer which is to be applied to rotating shafts, particularly those within a housing, whereby the leakage of grease, oil or other fluids will be effectively prevented.

One of the important objects of this invention is to provide an oil seal or the like composed of metal and a flexible diaphragm, and wherein the flexible diaphragm is of a rubber-like composition and firmly attached by vulcanizing or the like to at least one portion of the metallic shell in a fluid sealing relationship therewith.

Another important object of the invention resides in the provision of a combined metal and composition seal between a rotating shaft and the surrounding housing, and one wherein a more positive sealing action is provided than would be possible by the use of either the metal or the composition alone.

A still further important object of the invention is the provision, in a fluid seal of the class described, of a construction which requires a minimum number of parts and also a minimum number of manufacturing operations and which will, at the same time, provide a durable, efficient, and commercially salable article.

Other and further important objects of the invention will be apparent from the disclosures in the accompanying drawing and following specification.

The invention, in a preferred form, is illustrated in the drawing and hereinafter more fully described.

Figure 1:
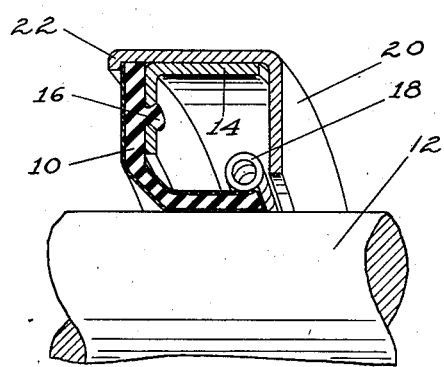
Figure 1 is a sectional view of one of the improved fluid seals of this invention, showing a preferred type of simplified construction.

The reference numeral 10 indicates generally a flexible diaphragm or packing element which is preferably a combination of synthetic rubber and a suitable fabric or the like, and which is molded to the desired shape and contour so as to sealingly cooperate with a rotating shaft 12.

In the molding operation, the diaphragm 10 is vulcanized or otherwise adhesively secured to a cup-shaped supporting shell 14 of metal which, in this instance, is L-shaped in cross-section as shown, and the vulcanizing operation is such that portions of the diaphragm 16 are squeezed or otherwise forced through openings in the metal shell so as to produce a firm and positive adhesion and prevent any danger of the same becoming loose or falling off.

This structure would conceivably of itself provide a satisfactory oil seal, but, in most instances, it has been found preferable to embody a garter spring or the like 18 which acts to contract the shaft contacting portion of the diaphragm 10 against the rotating shaft 12, thereby insuring a better sealing operation.

In order to positively maintain the garter spring 18 in position on a diaphragm and also to provide a more finished article and one which can be more readily driven into position in a housing or the like, an outer shell 20 is provided also of metal and of cup-shaped contour which is of such dimensions as to form a pressed fit with the inner shell 14, and an extending edge 22 is provided which is then bent or spun down into contacting relationship with the adjacent periphery of the diaphragm 10 so as to provide a unitary structure which cannot come apart and which, furthermore, enhances the sealing action.

It will be noted that the inner periphery of the annular opening in the inner metal shell 14 is spaced away for quite a considerable distance from the outer surface of the shaft 12, thereby providing for a considerable flexibility of operation of the diaphragm so far as shaft sealing action is concerned, and accordingly insuring a fluid-tight seal even though the shaft be somewhat out of round or eccentrically positioned with regard to the housing, in which last event an undesirable wobbling action takes place. A relatively great amount of wobbling action can be securely sealed by the use of structures of this type as will be obvious. It will further be obvious that the contacting of the outer periphery of the flexible diaphragm 10 with the inner face of the outer metal shell 20—22 will also act to provide a better fluid seal than if a simple metal-to-metal contact were employed.

Figure 2:
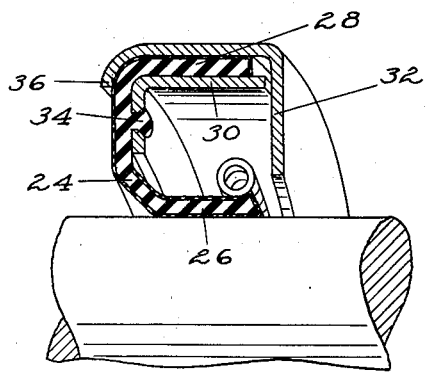
Figure 2 is another sectional view, illustrating a modification wherein the flexible diaphragm forms a seal both against the rotating shaft and also indirectly with the surrounding housing.

An enlargement of this idea is illustrated in Figure 2 wherein the diaphragm 24, in addition to having a shaft contacting portion 26, is also provided with an integral extension 28 which is fitted between the outer face of the inner shell 30 and the inner face of the outer shell 32. As shown, the diaphragm is vulcanized to the inner shell 30 with portions 34 thereof protruding through openings, and this vulcanization or adhesive application extends over practically the whole of the two outer surfaces of the inner shell 30, after which the outer shell 32, also cup-shaped, is fitted over the assembled parts with one edge 36 spun or bent down around into gripping and oil-sealing relationship with the corresponding portion of the diaphragm or sealing element 24.

In this manner an even more efficient sealing action is obtained, particularly so far as the housing is concerned, inasmuch as the press fitting of the assembled seal into a housing will have the effect of slightly contracting the outer rim of the shell 32 whereby the adjacent portion 28 of the diaphragm is also compressed between this shell and the inner shell 30 whereby a cork-like sealing action is effected.

Figure 3:
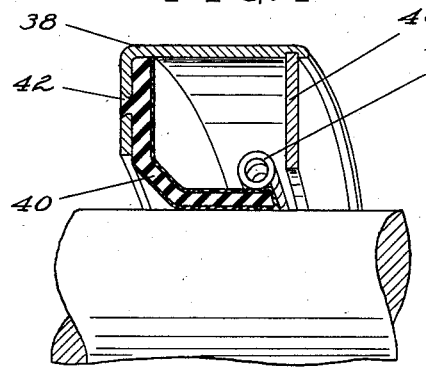
Figure 3 illustrates a further modified and even more simple form of the invention.

A simplified form of seal is illustrated in Figure 3 wherein an outer shell 38 L-shaped in cross-section has a diaphragm 40 molded or vulcanized thereto, the diaphragm, in this case, being applied to the inner face of what might be termed the bottom of the shell, and any portions 42 of the diaphragm, which might protrude or be expressed through the openings in the shell 38, can be cut off flush with the surface thereof so as to produce a finished looking article. In order to maintain the garter spring 44 in position, a washer 46 is fitted into the corresponding outer face of the shell as illustrated.

Figure 4:
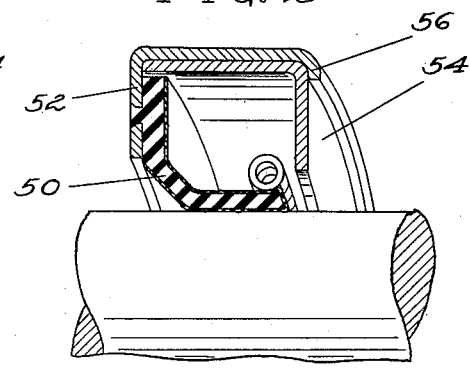
Figure 4 is a slight modification of the device shown in Figure 3.

A slight departure from this procedure is shown in Figure 4 wherein the diaphragm 50 is molded or vulcanized to the outer shell 52, but instead of the washer 46 of Figure 4, an inner shell 54 is provided which is press-fitted or otherwise placed inside the outer shell 52 and preferably with one edge or rim thereof contacting the bottom of the shell 52 as illustrated. The outer rim or edge of the shell 52 is then spun or bent downwardly over the corresponding section of the inner shell 54 whereby a unitary and very substantial structure is produced.

Figure 5:
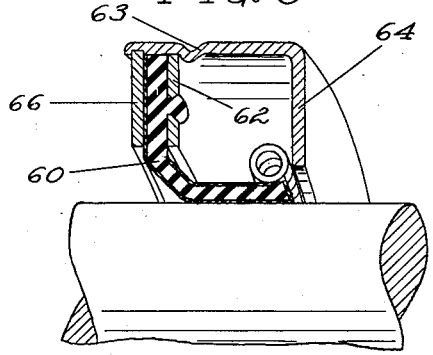
Figure 5 is a modified form of the seal of Figure 1, illustrating the employment of a further backing or reinforcing washer.

A further embodiment which represents an improvement over the structure of Figure 4 is shown at Figure 5 wherein the diaphragm 60 is molded to the outer face of a flat washer 62, and then a cup-shaped outer shell 64 is applied thereover. The extent of this application is determined by a bead 63 which is formed in the outer periphery of the shell 64 against which the washer 62 is applied; after which a washer 66 is fitted into the periphery of the outer shell in such a manner as to produce a tight joint and to cover the adjacent surface of the diaphragm 60, thereby producing an oil seal which has an all metal outer surface such as those shown in Figures 3 and 4, while, at the same time, providing for a molding of the diaphragm to a metallic mold or the like.

Figure 6:
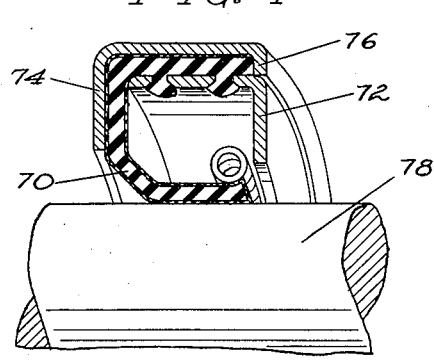
Figure 6 illustrates a modified form of the seal of Figure 2.

In Figure 6, a modified form of the construction of Figure 2 is illustrated, and in this instance, a diaphragm 70 is molded or otherwise attached to a cup-shaped shell 72 which may be termed the inner shell, after which an outer shell 74 also cup-shaped is fitted over the diaphragm into a position as illustrated and with one edge or rim thereof 76 bent downwardly over the corresponding rim of the diaphragm and flush with the outer surface of the inner shell or cup 72. In this manner, a unitary fluid seal is provided having all-metal outer surfaces, but with a composition sealing material co-acting at least indirectly with the housing surrounding the shaft 78 so as to produce the desired compressive sealing action.

Figure 7:
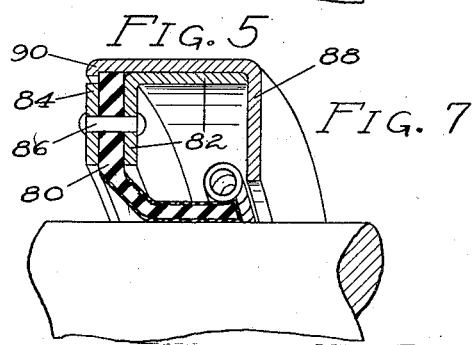
Figure 7 is a further modification.

In Figure 7, a further modified form of the invention is illustrated which also provides for a grease retainer having an all-metal outer surface, this structure comprising essentially an inner cup-shaped washer 82 to which is molded or otherwise applied a diaphragm 80, and an outer washer 84 is then fitted over the outer face of the diaphragm either by the same vulcanization process or by means of a rivet or the like 86. In fact, both vulcanizing and riveting may be employed. A cup-shaped outer shell 88 is then fitted over the assembled structure with the edge 90 of the shell 88 turned downwardly as shown in Figure 7 to provide a tight joint and also to produce a unitary structure. Here again is provided a double seal by the use of one diaphragm, the first sealing action, of course, taking place between the sleeve portion of the diaphragm and the rotating shaft, and the second sealing action being between the element 82 and the outer shell 88 at the line where the periphery of the diaphragm is squeezed into the angle of the element 82 by means of the downwardly turned edge 90 of the cup 88.

It will be evident that herein is provided a fluid seal or grease retainer which is especially well-adapted for sealing rotating shafts against grease or oil leakage, and particularly for use in automotive constructions wherein the flexible diaphragm, in addition to acting against the rotating shaft in a sealing relationship therewith, is also maintained in a sealing relationship with its supporting shell, and in some instances, at least indirectly, with the housing surrounding the rotating shaft. Obviously, any of these structures may be reversed so that the seal may be fitted into the shaft so as to rotate therewith, whereupon the relatively movable sealing parts will comprise the diaphragm and the surrounding housing.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

An oil seal for shafts, comprising a cup-shaped metal shell, a flexible diaphragm molded to the shell on one face and the outer rim thereof, a cup-shaped outer shell fitted over the inner shell and having an inturned edge gripping and compressing the periphery of the diaphragm against said inner shell.

JOSEPH B. VICTOR.